(12) United States Patent
Kim et al.

(10) Patent No.: US 9,729,921 B2
(45) Date of Patent: Aug. 8, 2017

(54) TELEVISION PROGRAM OPTIMIZATION FOR USER EXERCISE

(71) Applicant: INTERNATIONAL BUSINESS MACHINES CORPORATION, Armonk, NY (US)

(72) Inventors: Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/755,217

(22) Filed: Jun. 30, 2015

(65) Prior Publication Data

US 2017/0006338 A1     Jan. 5, 2017

(51) Int. Cl.
    *H04N 21/442*     (2011.01)
    *H04N 21/475*     (2011.01)
    (Continued)

(52) U.S. Cl.
CPC ... *H04N 21/44218* (2013.01); *A63B 22/0242* (2013.01); *A63B 24/0062* (2013.01); *A63B 24/0075* (2013.01); *A63B 24/0087* (2013.01); *G06F 9/542* (2013.01); *G06Q 30/02* (2013.01); *H04N 21/475* (2013.01); *A61H 23/0254* (2013.01); *A61H 2201/1261* (2013.01); *A61H 2201/501* (2013.01); *A61H 2201/5007* (2013.01); *A61H 2201/5043* (2013.01); *A61H 2201/5048* (2013.01); *A61H 2201/5069* (2013.01); *A61H 2201/5079* (2013.01); *A61H 2230/06* (2013.01); *A61H 2230/065* (2013.01);
(Continued)

(58) Field of Classification Search
CPC .......... H04N 21/44218; H04N 21/475; H04N 21/258; H04N 21/45; H04N 21/466; H04N 21/44213; H04N 21/44222; A63B 24/0062; A63B 2024/0068; A63B 24/0087; A63B 2024/0093
See application file for complete search history.

(56) References Cited

U.S. PATENT DOCUMENTS 6,142,913 A     11/2000    Ewert
7,728,214 B2     6/2010    Oliver et al.
(Continued)

FOREIGN PATENT DOCUMENTS

DE     10 2012 210 098 A1     12/2013

OTHER PUBLICATIONS

Hu, Wei-Hua et al.; "Realizing A Multi-Media Treadmill Fusion With Multiple Characters And Structured Scenes", IEEE International Conference On Cyberwolrds, Sep. 22-24, 2008, pp. 579-582.
(Continued)

*Primary Examiner* — Benjamin R Bruckart
*Assistant Examiner* — Tien M Nguyen
(74) *Attorney, Agent, or Firm* — Scully, Scott, Murphy & Presser, P.C.; Alexa L. Ashworth, Esq.

(57) ABSTRACT

The present disclosure relates generally to the field of television program optimization for user exercise. In various embodiments, systems, methods and computer program products are provided.

12 Claims, 7 Drawing Sheets

(51) Int. Cl.
*A63B 24/00* (2006.01)
*A63B 22/02* (2006.01)
*G06F 9/54* (2006.01)
*G06Q 30/02* (2012.01)
*A61H 23/02* (2006.01)
*A63B 21/005* (2006.01)
*A63B 21/072* (2006.01)
*A63B 22/00* (2006.01)
*A63B 22/06* (2006.01)

(52) U.S. Cl.
CPC ...... *A61H 2230/30* (2013.01); *A61H 2230/62* (2013.01); *A61H 2230/625* (2013.01); *A63B 21/0058* (2013.01); *A63B 21/0724* (2013.01); *A63B 22/0056* (2013.01); *A63B 22/0605* (2013.01); *A63B 22/0664* (2013.01); *A63B 2024/009* (2013.01); *A63B 2024/0068* (2013.01); *A63B 2024/0071* (2013.01); *A63B 2024/0078* (2013.01); *A63B 2024/0081* (2013.01); *A63B 2024/0093* (2013.01); *A63B 2220/18* (2013.01); *A63B 2220/30* (2013.01); *A63B 2225/20* (2013.01); *A63B 2225/50* (2013.01); *A63B 2230/06* (2013.01); *A63B 2230/062* (2013.01); *A63B 2230/30* (2013.01); *A63B 2230/62* (2013.01); *A63B 2230/625* (2013.01)

(56) References Cited

U.S. PATENT DOCUMENTS

| | | | |
|---|---|---|---|
| 7,862,478 B2 * | 1/2011 | Watterson | A63B 21/005 482/1 |
| 8,287,434 B2 | 10/2012 | Zavadsky et al. | |
| 8,690,735 B2 | 4/2014 | Watterson et al. | |
| 2006/0058155 A1 | 3/2006 | Kumar | |
| 2007/0219059 A1 | 9/2007 | Schwartz et al. | |
| 2008/0097633 A1 | 4/2008 | Jochelson et al. | |
| 2009/0044687 A1 | 2/2009 | Sorber | |
| 2010/0188405 A1 | 7/2010 | Haughay, Jr. et al. | |
| 2013/0198766 A1* | 8/2013 | Yoon | H04N 21/47 725/12 |
| 2013/0263719 A1 | 10/2013 | Watterson et al. | |
| 2014/0113770 A1 | 4/2014 | Yim | |
| 2014/0142459 A1 | 5/2014 | Jayalth et al. | |
| 2014/0204277 A1 | 7/2014 | Adderly et al. | |
| 2014/0256511 A1 | 9/2014 | Smith | |
| 2014/0371887 A1 | 12/2014 | Hoffman et al. | |
| 2015/0004578 A1 | 1/2015 | Gilley et al. | |

OTHER PUBLICATIONS

Hu, Hai et al.; "Game System of Treadmill Based on Video Capture", 2010 IEEE/ACM International Conference on Green Computing And Communications & 2010 IEEE/ACM International Conference on Cyber, Physical And Social Computing, Dec. 18-20, 2010, pp. 836-839.

Ikehara et al.; "Development of A Device That Combines Exercise And Entertainment", Consumer Electronics (GCCE), 2014 IEEE 3rd Global Conferene On, Oct. 7-10, 2014, pp. 432-433.

http://livehealthy.chron.com/benefit-watching-tv-treadmill-5825.html, "The Benefit of Watching TV While on Treadmill" printed Jun. 20, 2015.

* cited by examiner ( From FIG. 2A )

EXECUTING BY THE PROCESSOR, BASED UPON: (A) THE CORRELATED CONTENT CHARACTERISTIC AND EXERCISE CHARACTERISTIC; (B) THE CURRENT EXERCISE INFORMATION; AND (C) THE CURRENT PROGRAM INFORMATION, AT LEAST ONE OF: (I) SUGGESTING A CHANGE TO THE FIRST USER OF AT LEAST ONE ATTRIBUTE OF THE CURRENT TELEVISION PROGRAM THAT IS BEING VIEWED BY THE FIRST USER WHILE THE FIRST USER PERFORMS THE CURRENT EXERCISE; (II) SUGGESTING A CHANGE TO THE FIRST USER OF AT LEAST ONE ATTRIBUTE OF AN EXERCISE DEVICE THAT THE FIRST USER IS CURRENTLY USING; (III) CHANGING AT LEAST ONE ATTRIBUTE OF THE CURRENT TELEVISION PROGRAM THAT IS BEING VIEWED BY THE FIRST USER WHILE THE FIRST USER PERFORMS THE CURRENT EXERCISE; AND (IV) CHANGING AT LEAST ON ATTRIBUTE OF AN EXERCISE DEVICE THAT THE FIRST USER IS CURRENTLY USING
213

FIG. 2b

TELEVISION PROGRAM OPTIMIZATION FOR USER EXERCISE

BACKGROUND

Treadmills and related devices (such as, for example, elliptical machines, steppers, or stationery bicycles) can be used for exercise and sometimes even for pain relief, emotional well-being, or as a part of a physical therapy program. Such exercise devices can provide efficient aerobic workouts. Even for beginners, and for recovering patients, exercise devices can often be well tolerated by most individuals regardless of fitness level and for most back conditions. As strength and endurance are developed, these kinds of devices can be used for jogging and/or for interval training. However, sometimes people need to be motivated to use treadmills and the like, partly because the use of machines can be boring. Many people stay on treadmills longer and/or at higher speeds when watching certain kinds of TV programs, actors, plot lines, genres, etc. if the watcher is engaged. Alternatively, certain kinds of TV programs can have a negative effect on a desired exercise outcome and mood, potentially even leading to interrupting and stopping the exercise.

In this regard, the present disclosure relates generally to the field of television program optimization for user exercise. In various embodiments, systems, methods and computer program products are provided.

SUMMARY

One embodiment provides for receiving signals from an exercise device (e.g., a treadmill, an elliptical machine, a stepper, or a stationary bicycle) and/or exercise monitor (e.g., FITBIT), receiving signals from a television broadcast (e.g. a TV show (or movie) ID and associated content), deeply analyzing the content of the broadcast in real time, and correlating the analyzed content with at least one exercise characteristic (e.g., the user works faster or longer when a broadcast has a certain characteristic). Moreover, based on the signals and correlations, at least one attribute of the broadcast may be changed and/or at least one attribute of the exercise device may be changed (e.g. increase speed of exercise device, decrease speed of exercise device, increase resistance of exercise device, decrease resistance of exercise device, determine a TV show (or movie) that will be more motivational (and switch to the show (or movie), with user permission)). Moreover, active learning and/or machine learning can be used to "learn" and optimize TV program changes and selections (along with exercise device changes and selections) for an individual, as well as also for a particular demographic (for example, people with medical conditions (e.g., cognitive and/or motor problems)).

In one embodiment, a computer-implemented method for television program optimization based upon exercise by a first user is provided, the method comprising: obtaining, by a processor, historic exercise information indicative of exercise that had been performed by the first user; obtaining, by the processor, historic television program information indicative of at least one television program that had been viewed by the first user while the first user had been performing exercise; analyzing by the processor, based upon the obtained historic television program information, a content of the at least one television program that had been viewed by the first user, wherein the analysis provides at least one content characteristic; correlating, by the processor, the at least one content characteristic with at least one exercise characteristic, wherein the at least one exercise characteristic is based upon the historic exercise information; obtaining, by the processor, current exercise information indicative of exercise that is currently being performed by the first user; obtaining, by the processor, current television program information indicative of a current television program that is currently being viewed by the first user while the first user performs the current exercise; and executing by the processor, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In another embodiment, a computer readable storage medium, tangibly embodying a program of instructions executable by the computer for television program optimization based upon exercise by a first user is provided, the program of instructions, when executing, performing the following steps: obtaining historic exercise information indicative of exercise that had been performed by the first user; obtaining historic television program information indicative of at least one television program that had been viewed by the first user while the first user had been performing exercise; analyzing, based upon the obtained historic television program information, a content of the at least one television program that had been viewed by the first user, wherein the analysis provides at least one content characteristic; correlating the at least one content characteristic with at least one exercise characteristic, wherein the at least one exercise characteristic is based upon the historic exercise information; obtaining current exercise information indicative of exercise that is currently being performed by the first user; obtaining current television program information indicative of a current television program that is currently being viewed by the first user while the first user performs the current exercise; and executing, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In another embodiment, a computer-implemented system for television program optimization based upon exercise by a first user is provided, the system comprising: a processor; and a memory storing computer readable instructions that, when executed by the processor, implement: a first obtaining element configured to obtain historic exercise information indicative of exercise that had been performed by the first user; a second obtaining element configured to obtain historic television program information indicative of at least one television program that had been viewed by the first user while the first user had been performing exercise; an analyzing element configured to analyze, based upon the obtained historic television program information, a content of the at least one television program that had been viewed by the first user, wherein the analysis provides at least one content characteristic; a correlating element configured to correlate the at least one content characteristic with at least one exercise characteristic, wherein the at least one exercise characteristic is based upon the historic exercise information; a third obtaining element configured to obtain current exercise information indicative of exercise that is currently being performed by the first user; a fourth obtaining element configured to obtain current television program information indicative of a current television program that is currently being viewed by the first user while the first user performs the current exercise; and a first executing element configured to execute, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

BRIEF DESCRIPTION OF THE DRAWINGS

Various objects, features and advantages of the present invention will become apparent to one skilled in the art, in view of the following detailed description taken in combination with the attached drawings, in which:

FIGS. 2A and 2B depict a flowchart of a method according to an embodiment.

DETAILED DESCRIPTION

Figure 1:
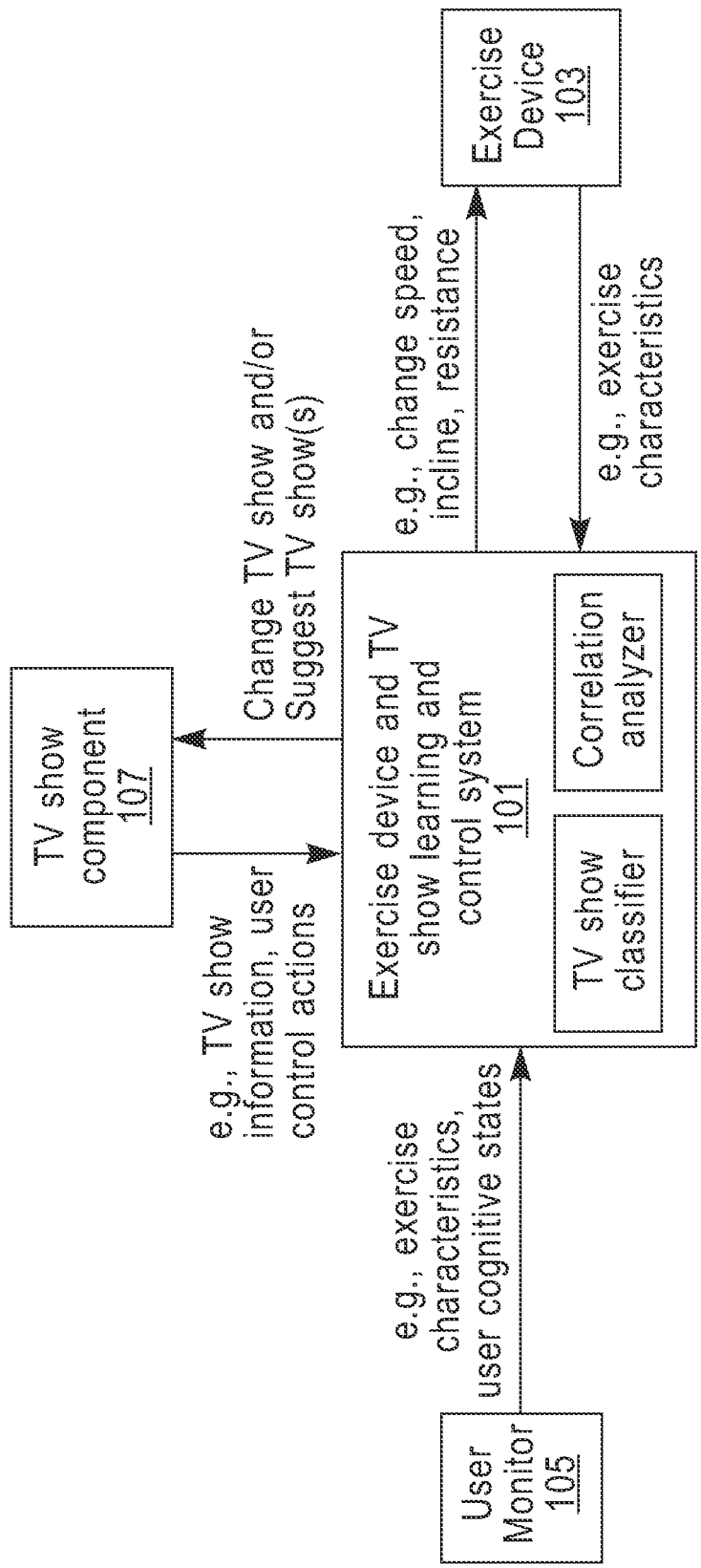
FIG. 1 depicts a block diagram of a system (including a learning and control element) according to an embodiment.

Referring now to FIG. 1, included in this embodiment is exercise device and TV show learning and control system 101. This control system 101 is in operative communication with exercise device 103 and user monitor 105 to receive therefrom exercise characteristics, user cognitive states and the like. Further, control system 101 is in operative communication with TV show component 107 to: (a) receive therefrom TV show information and user control actions; and (b) send TV show change control commands (and/or suggestions which may be displayed, for example, on the TV). Moreover, as described herein, system 101 may control exercise device 103 (e.g., change speed, incline, resistance, etc.).

Still referring to FIG. 1, control system 101 may provide content analysis of the TV show (via TV show classifier), wherein such content analysis may comprise one or more of:

(a) dialog analyzed with natural language processing (NLP), actors, topic analysis, plot analysis, scenery, object analysis via the use of deep neural networks, etc. (such deep neural networks (DNNs) may be employed, for example, to help assess similarity of objects in images and broadcasts; in one specific example, DNNs have been demonstrated to have outstanding performance on image classification tasks, including recognizing objects such as animals). Of course, various different approaches may be used together to augment analysis/classification accuracy.

Figure 2A:
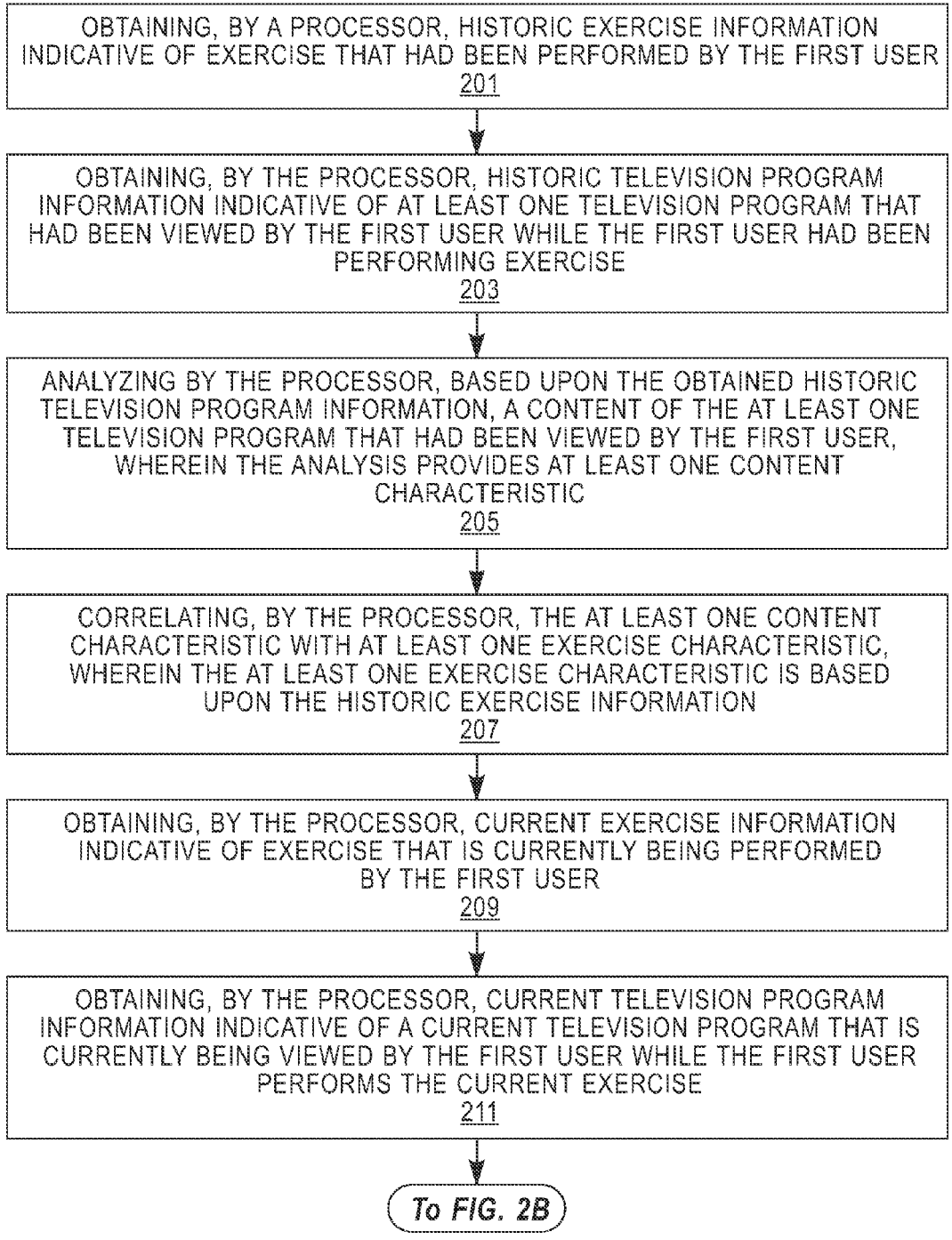

Referring now to FIGS. 2A and 2B, a method for television program optimization based upon exercise by a first user is shown. As seen in these FIGS. 2A and 2B, the method of this embodiment comprises: at 201—obtaining, by a processor, historic exercise information indicative of exercise that had been performed by the first user; at 203—obtaining, by the processor, historic television program information indicative of at least one television program that had been viewed by the first user while the first user had been performing exercise; at 205—analyzing by the processor, based upon the obtained historic television program information, a content of the at least one television program that had been viewed by the first user, wherein the analysis provides at least one content characteristic; at 207—correlating, by the processor, the at least one content characteristic with at least one exercise characteristic, wherein the at least one exercise characteristic is based upon the historic exercise information; at 209—obtaining, by the processor, current exercise information indicative of exercise that is currently being performed by the first user; at 211—obtaining, by the processor, current television program information indicative of a current television program that is currently being viewed by the first user while the first user performs the current exercise; and at 213—executing by the processor, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In various examples, the exercise characteristic may be any of: exercise device (e.g., treadmill) speed, exercise device (e.g., treadmill) incline, exercise device (e.g., strength-training device) resistance force, exercise device (e.g., strength-training device) resistance pulsation, user's heart rate, user's posture, user's cognitive state (e.g. boredom, elation), creation or change of an exercise plan, pausing/rewinding of content.

In another example, a user may want to improve his or her overall mood (which may persist for hours after the exercise and that may also be modulated by the nature of the movie or TV show being watched), in conjunction with the exercise performance. In this regard, it is possible for a user to express his or her mood at time T after the exercise (which expression of mood may comprise an exercise characteristic).

Further, various characteristics may be aggregated (e.g., with user permissions) for a user's peer group and used as input and for comparisons.

In other examples, various cognitive input may be obtained from the user, such as a user's attention e.g., eyes that are shifting away from the display screen are suggestive of lack of interest). In this regard, there are several eye-tracking solutions including EyeX from tobbii (http://www.tobii.com/) and one from Google Glass. This cognitive input may comprise one or more exercise characteristics.

Figure 3:
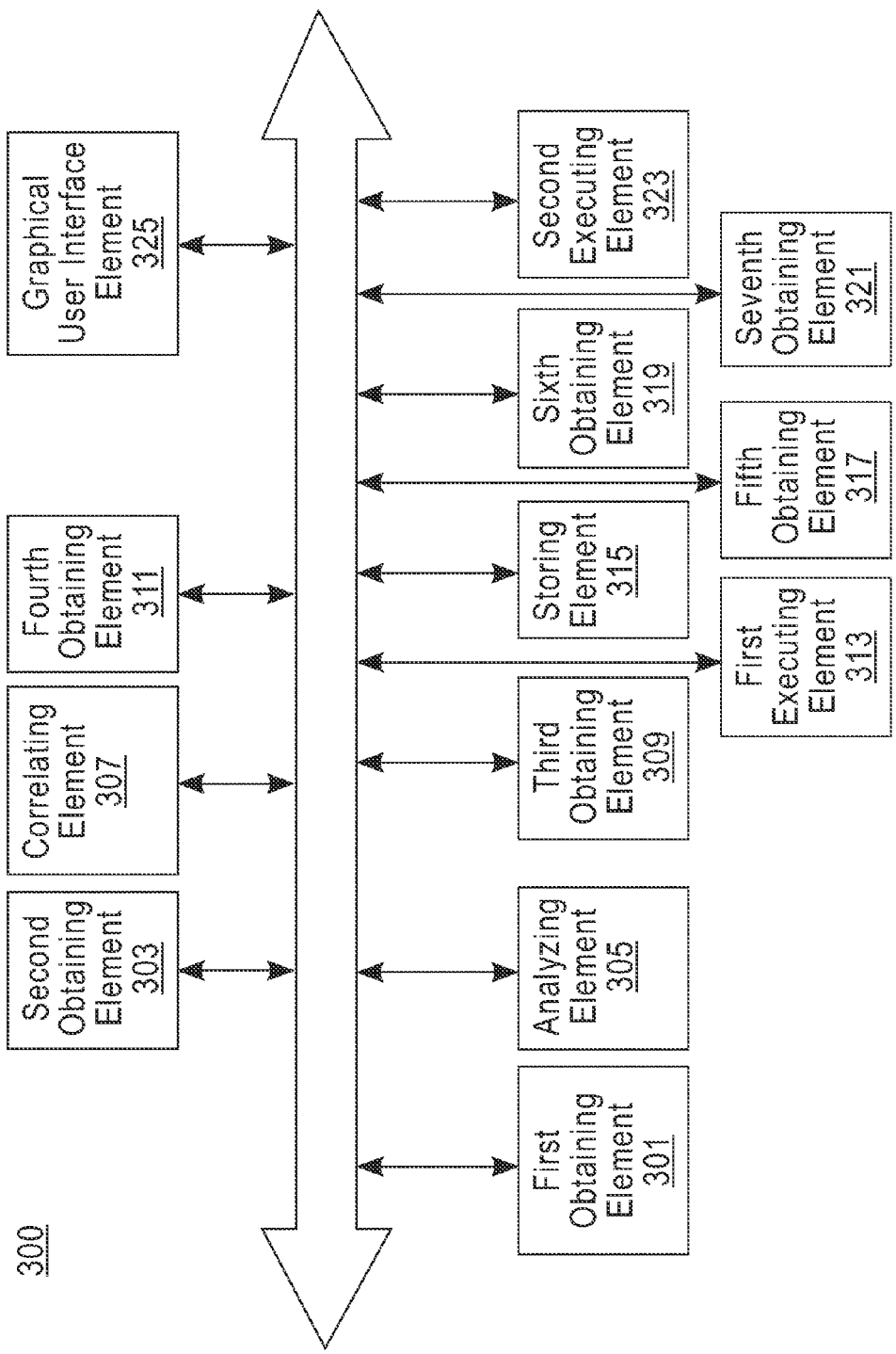
FIG. 3 depicts a block diagram of a system according to an embodiment.

Referring now to FIG. 3, in another embodiment, a system 300 for television program optimization based upon exercise by a first user is provided. This system may include a processor (not shown); and a memory (not shown) storing computer readable instructions that, when executed by the processor, implement: a first obtaining element 301 configured to obtain historic exercise information indicative of exercise that had been performed by the first user; a second obtaining element 303 configured to obtain historic television program information indicative of at least one television program that had been viewed by the first user while the first user had been performing exercise; an analyzing element 305 configured to analyze, based upon the obtained historic television program information, a content of the at least one television program that had been viewed by the first user, wherein the analysis provides at least one content characteristic; a correlating element 307 configured to correlate the at least one content characteristic with at least one exercise characteristic, wherein the at least one exercise characteristic is based upon the historic exercise information; a third obtaining element 309 configured to obtain current exercise information indicative of exercise that is currently being performed by the first user; a fourth obtaining element 311 configured to obtain current television program information indicative of a current television program that is currently being viewed by the first user while the first user performs the current exercise; and a first executing element 313 configured to execute, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In addition, as seen in FIG. 3, the computer readable instructions, when executed by the processor, may implement: a storing element 315 configured to store the correlated content characteristic and exercise characteristic; a fifth obtaining element 317 configured to obtain the stored correlated content characteristic and exercise characteristic associated with the first user; a sixth obtaining element 319 configured to obtain current exercise information indicative of exercise that is currently being performed by a second user; a seventh obtaining element 321 configured to obtain current television program information indicative of a current television program that is currently being viewed by the second user while the second user performs the current exercise; and a second executing element 323 configured to execute, based upon: (a) the obtained stored correlated content characteristic and exercise characteristic associated with the first user; (b) the current exercise information associated with the second user; and (c) the current program information associated with the second user, at least one of: (i) suggesting a change to the second user of at least one attribute of the current television program that is being viewed by the second user while the second user performs the current exercise; (ii) suggesting a change to the second user of at least one attribute of an exercise device that the second user is currently using; (iii) changing at least one attribute of the current television program that is being viewed by the second user while the second user performs the current exercise; and (iv) changing at least one attribute of an exercise device that the second user is currently using.

In addition, as seen in FIG. 3, the computer readable instructions, when executed by the processor, may implement: a graphical user interface element 325 configured to display to the first user the suggested changes and to receive from the first user approval or disapproval for the suggested changes and configured to display to the second user the suggested changes and to receive from the second user approval or disapproval for the suggested changes.

In one example, communication between and among the various components of FIG. 3 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 4.

Figure 4:
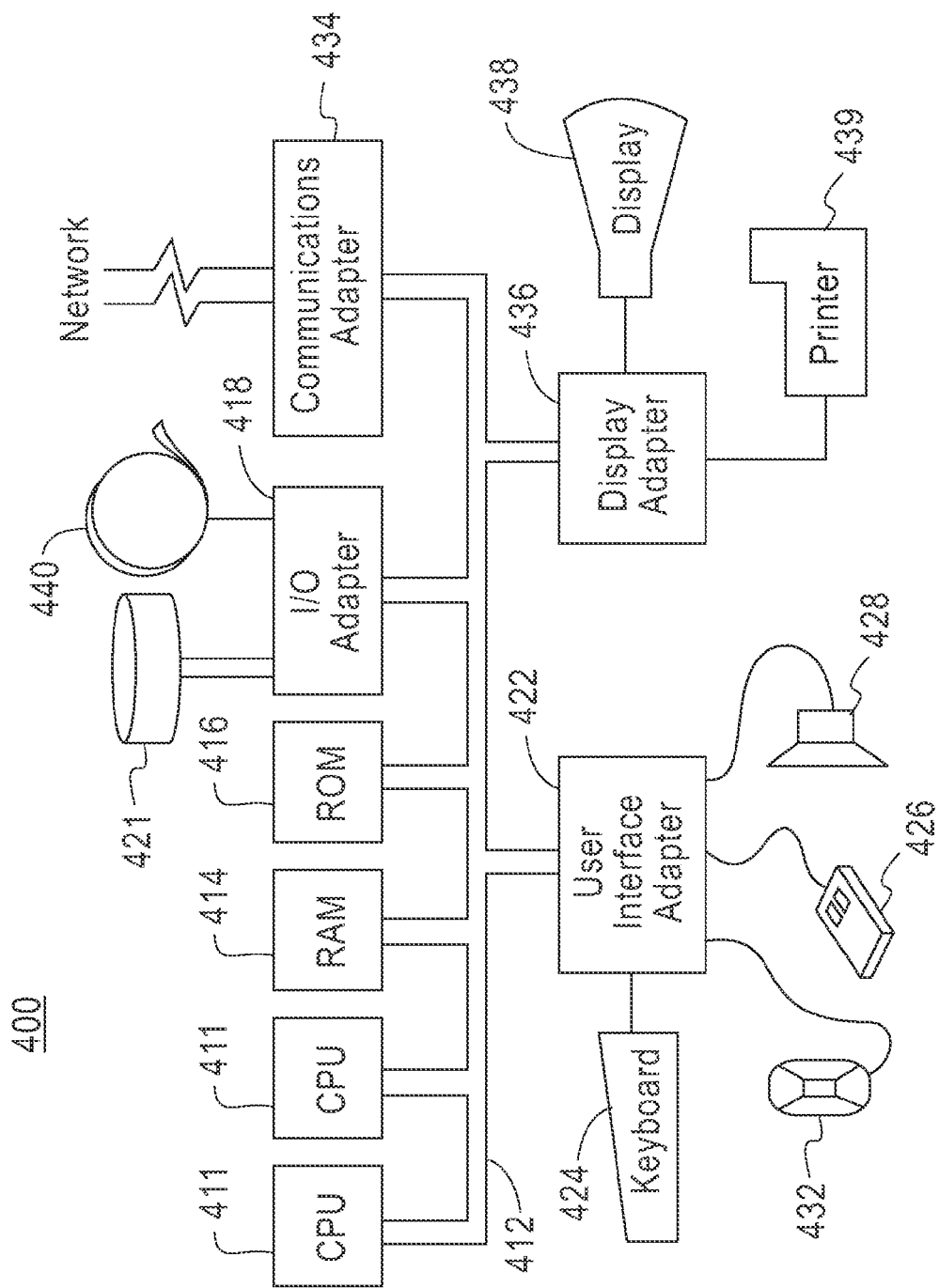
FIG. 4 depicts a block diagram of a system according to an embodiment.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an Intranet, a local area network (LAN), etc., and a display adapter 436 for connecting the bus 412 to a display device 438 and/or printer 439 (e.g., a digital printer or the like).

Figure 5:
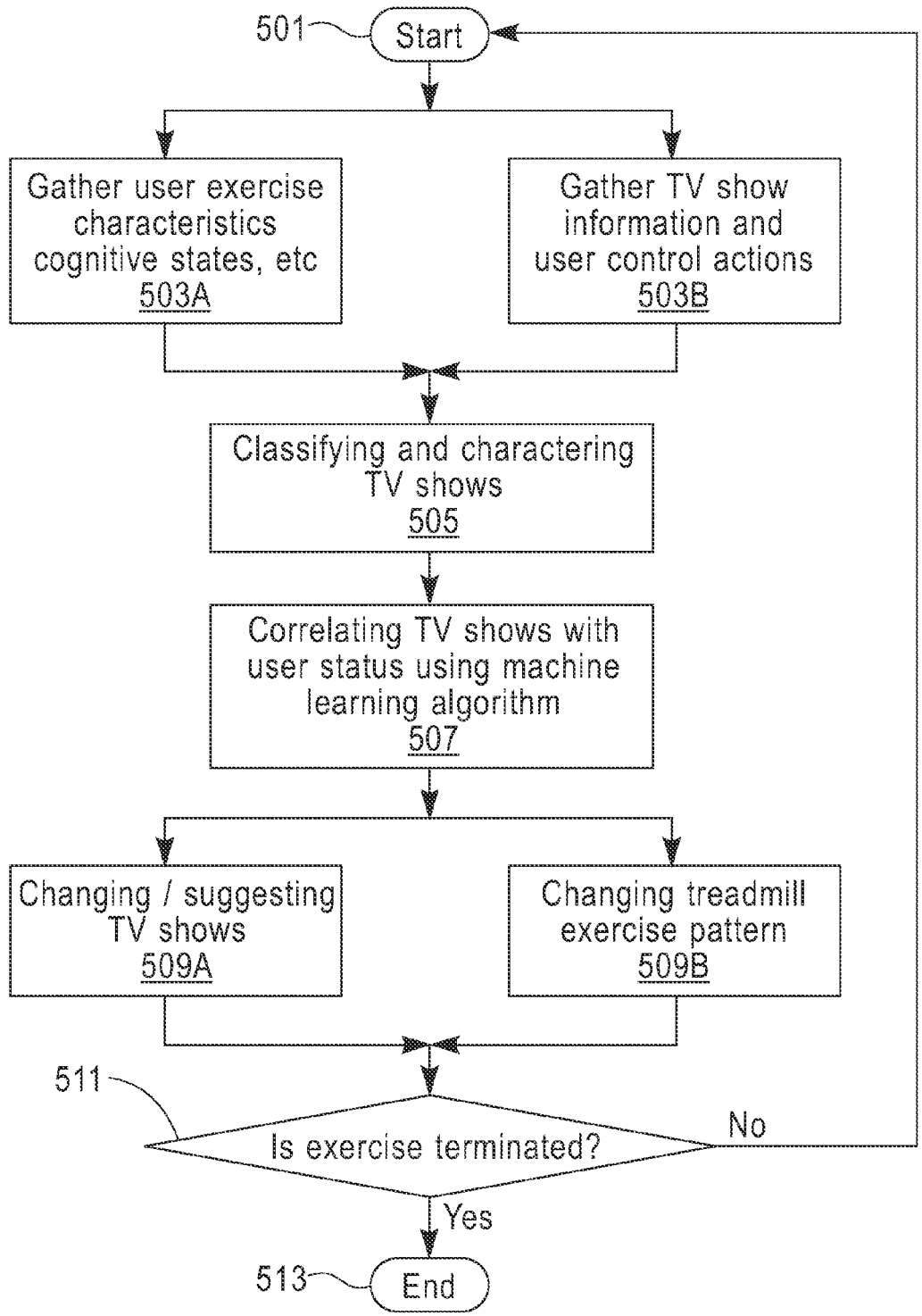
FIG. 5 depicts a flowchart of a method according to an embodiment.

Referring now to FIG. 5 is a flowchart of a method according to an embodiment. As seen in this FIG. 5, the process starts at step 501. Step 503A is to gather user exercise characteristics, cognitive states, etc. Also, Step 503B is to gather TV show information and user control actions. Step 505 is classifying and characterizing the TV shows. Step 507 is correlating TV shows with user status (using machine learning algorithm). Step 509A is changing/suggesting TV shows and Step 509B is changing exercise device pattern (e.g., treadmill exercise pattern). Step 511 is to determine whether the exercise is terminated. If "NO", the process loops back to Step 501, if "Yes" the process ends at 513.

Figure 6:
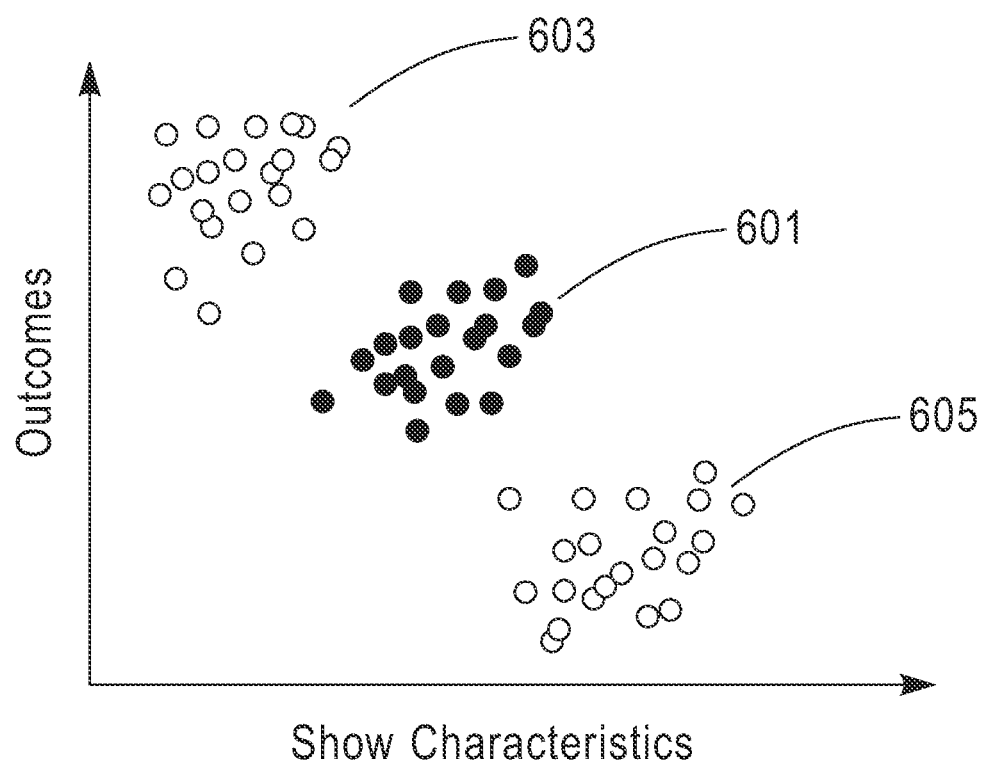
FIG. 6 depicts an example plot of clustering according to an embodiment.

Referring now to FIG. 6 is an example of clustering/classification. In this example, the movies/TV shows can be clustered automatically using an unsupervised clustering algorithm, such as k-means algorithm. Each movie/TV show has a vector of attributes. The attributes include meta-data (such as genre, characters, director), feedback from social network, etc. Using the attribute vector as the input, the clustering/classification component assigns each movie/TV show to a cluster.

Still referring to FIG. 6, movies/TV shows may be described with a number of characteristics, such as listed herein, which are arranged in N-tuple characteristic vectors. Possible elements of such vectors could be show genre, names of actors, being one of the favorite actors, rating of show, its popularity on social sites, animals, romantic scenes, violence, humor, sophistication, etc. This information about the program is combined with the monitoring data from the exercise machine, and the pre-set outcome or goal of the exercise, and if the combination of the given program and the achieved exercise corresponds to the desired outcome. In the example in FIG. 6, depicted are three possible outcomes and show characteristics—achieving goals (601), exceeding set goals (603) and falling behind to desired goals (605). The trained system monitors the progress of the exercise and the correlation for the selected program, and if, for example, it is in the achieving or falling behind clusters, the system selects one of the programs which would fall in another cluster (for example, a higher performing cluster), and suggests the user to switch the program. If the user agrees to program changing (for example, by vocal agreement to do so), the system switches the program. Note that the level of exercise is highly personable, and what is considered average performance for one user can be the same absolute metric as extraordinary performance for another user. Similarly for the program selection, the content stimulating or having a positive effect on one user can have much less favorable effect on another user. In addition, over time for the same user, as he or she gains strength, or recovers because of the therapy, the correlation between the programs and exercise success changes too. Thus, in one example, the machine learning system has to be continuously updated for each person using the system.

In one example, various monitoring components may track the history of the user's viewing activities while exercising. The system may collect user feedback by prompting the user after the viewing activity. The system can also monitor the cognitive status (and/or emotional status based on biometric data) of the user to assess user preference (e.g., "like" versus "dislike").

In one example, by locating the cluster to which past viewed movies/TV shows belong, the system can automatically suggest/recommend similar movies/shows from the cluster. This reflects the user's personal preferences of movies/TV shows.

In yet other embodiments, the system may employ wearable monitoring devices and associated exercise apparatuses. For example, a garment borne sensor system may acquire data on a user's performance during exercise. The data may be analyzed in real time to determine TV program selection and feedback may be provided to the user based on the analysis. Analysis may be used to alter behavior of the user and/or an apparatus the user is engaged with during an activity, such as exercise, conditioning, therapy, etc. A piece of exercise equipment may be instrumented and in communication with the sensor system and may be controlled in real time to adjust settings of the exercise equipment to affect the user during the exercise routine. Communication between the sensor system and the exercise equipment may be wireless. The system can also involve detecting the current state and/or moving or changing state of a person (e.g., via any form of "movement detection unit", such as, for example, camera based motion detection). The TV program may be selected based on a detected state of a person. The selected TV program (e.g. drama, comedy, etc) may be obtained from a digital TV data base. The system may use any of: a device for selecting a TV broadcast used for motivating a person or group of people, a computer program for selecting a TV broadcast used for motivating a person or group of people, and a computer program product for selecting a TV broadcast used for motivating a person or group of people. Again, more generally, embodiments may motivate physical performance through TV program selection and TV program genre selection via presenting a TV program to a user while concurrently receiving workout information. The workout information may include a current performance level of the user and/or a current geographical characteristic being traversed by the user. The method further can include modifying the broadcast rendition based on the current performance level of the user and/or the current geographical characteristic being traversed by the user.

In another example, the system can guide users in the experience of rhythmic exercise. Playback of a TV program segment that has a known structure (e.g., dialog pattern, sequence of events or visuals, sequence of actors, sequences of scenery) can be accompanied by non-audio sensory cues such as a light signal or tactical signal (e.g., vibration) to mark rhythmic events in the TV program. In addition, equipment can be provided to guide a user in performing a GDM (goal directed movement) sequence that is selected to be performed in synchronism with the rhythm, cadence and/or sequence of a TV program (e.g. a program featuring a fight, a dance, etc). The user's motion may be detected and compared to desired GDM in the selected sequence and also compared to the rhythm of the TV signal. Sensory cues can be provided to guide the user in performing the GDM sequence rhythmically. The system may be implemented in cardio fitness equipment including, for example, treadmill, AMT and elliptical type exercise equipment.

As described herein are mechanisms for receiving signals from an exercise device (e.g., a treadmill, an elliptical machine, a stepper, or a stationary bicycle) and/or exercise monitor (e.g., FITBIT), receiving signals from a television broadcast (e.g. a TV show (or movie) ID and associated content), deeply analyzing the content of the broadcast in real time, and correlating the analyzed content with at least one exercise characteristic (e.g., the user works faster or longer when a broadcast has a certain characteristic). Moreover, based on the signals and correlations, at least one attribute of the broadcast is changed/suggested and/or at least one attribute of the exercise device is changed/suggested (e.g. increase speed of exercise device, decrease speed of exercise device, increase resistance of exercise device, decrease resistance of exercise device, determine a TV program that will be more motivational (and switch to the program, with user permission)).

In one example (based on the signals and correlations), instead of changing one or more attributes of the broadcast and/or exercise device, a recommendation may be made to the user with the options to change one or more attributes that would improve the "performance" or "effectiveness".

In another example (based on the signals and correlations), choose a "good" time (discussed in more detail below) to present recommendation or to change the attributes.

In another example, the content analysis may comprise one or more of: dialog analyzed with NLP, actors, topic analysis, plot analysis, scenery, object analysis via the use of deep neural networks.

In another example, an exercise characteristic may comprise one or more of: treadmill speed, heart rate, treadmill incline, creation or change of an exercise plan, exercise resistance force in a strength-training device, resistance pulsation, user's posture, cognitive state (e.g. boredom, elation), shifting of eyes away from display (suggestive of lack of interest), pausing/rewinding of content, and mood that may persist for time T after the exercise is completed.

In another example, the changed attribute of the broadcast may comprise one or more of: a different TV program (e.g. with user permission to change), a special unlocked TV program (e.g., if the user is "on track" with his or her exercise regime), a TV program genre (e.g. drama or comedy or honor or reality), the selection of programs with, for example, trees, pets, fight scenes, particular music genres as sound tracks, laugh tracks, the employment of a particular actor or actress, duration of scenes and/or shows, or bucolic scenes (e.g., pervasive use of bucolic scenes on the British sea coast).

In another example, the correlation analysis may include information on a user's medical profile and/or aggregate information from a group of users (e.g. social network preferences, demographic, etc.).

In another example, the active learning and machine learning may be used to "learn" and optimize TV program changes and selections for an individual and also for a demographic, such cohort, as people with medical conditions (e.g., cognitive and/or motor problems, etc.).

In another example, a "good" time to make a change/recommendation is one that minimizes the disruption to the flow of the exercise or to the story of a TV program. For example, the system may not want to prompt the user to make a selection from a set of TV programs when the user is in the middle of lifting a heavy barbell; this context can be detected, for example, by monitoring movement, blood flow, and/or heart rate.

As described herein, various embodiments may be used in the context of cognitive and contextual computing as well as other personal productivity applications.

In one embodiment, a computer-implemented method for television program optimization based upon exercise by a first user is provided, the method comprising: obtaining, by a processor, historic exercise information indicative of exercise that had been performed by the first user; obtaining, by the processor, historic television program information indicative of at least one television program that had been viewed by the first user while the first user had been performing exercise; analyzing by the processor, based upon the obtained historic television program information, a content of the at least one television program that had been viewed by the first user, wherein the analysis provides at least one content characteristic; correlating, by the processor, the at least one content characteristic with at least one exercise characteristic, wherein the at least one exercise characteristic is based upon the historic exercise information; obtaining, by the processor, current exercise information indicative of exercise that is currently being performed by the first user; obtaining, by the processor, current television program information indicative of a current television program that is currently being viewed by the first user while the first user performs the current exercise; and executing by the processor, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In one example, the historic exercise information is indicative of exercise that had been performed by the first user at a point in time prior to the exercise that is currently being performed by the first user but that is still a part of a current exercise session.

In another example, the historic exercise information is indicative of exercise that had been performed by the first user at a point in time prior to the exercise that is currently being performed by the first user and that is part of a prior exercise session that had been performed before a current exercise session.

In another example, the method further comprises storing, by the processor, the correlated content characteristic and exercise characteristic.

In another example, the correlated content characteristic and exercise characteristic upon which the executing is based had previously been stored by the processor.

In another example, the exercise characteristic is selected from the group comprising: (a) a speed of an exercise device used by the first user; (b) a resistance of an exercise device used by the first user; (c) a heart rate of the first user; (d) a posture of the first user; (e) a cognitive state of the first user; (f) a shifting of the first user's eyes away from a display upon which the television program had been viewed; and (g) any combination thereof.

In another example, the historic exercise information and the current exercise information are each provided by a device selected from the group comprising: (a) an exercise device; (b) an exercise monitor; and (c) any combination thereof.

In another example, the method further comprises: obtaining, by the processor, the stored correlated content characteristic and exercise characteristic associated with the first user; obtaining, by the processor, current exercise information indicative of exercise that is currently being performed by a second user; obtaining, by the processor, current television program information indicative of a current television program that is currently being viewed by the second user while the second user performs the current exercise; and executing by the processor, based upon: (a) the obtained stored correlated content characteristic and exercise characteristic associated with the first user; (b) the current exercise information associated with the second user; and (c) the current program information associated with the second user, at least one of: (i) suggesting a change to the second user of at least one attribute of the current television program that is being viewed by the second user while the second user performs the current exercise; (ii) suggesting a change to the second user of at least one attribute of an exercise device that the second user is currently using; (iii) changing at least one attribute of the current television program that is being viewed by the second user while the second user performs the current exercise; and (iv) changing at least one attribute of an exercise device that the second user is currently using.

In another embodiment, a computer readable storage medium, tangibly embodying a program of instructions executable by the computer for television program optimization based upon exercise by a first user is provided, the program of instructions, when executing, performing the following steps: obtaining historic exercise information indicative of exercise that had been performed by the first user; obtaining historic television program information indicative of at least one television program that had been viewed by the first user while the first user had been performing exercise; analyzing, based upon the obtained historic television program information, a content of the at least one television program that had been viewed by the first user, wherein the analysis provides at least one content characteristic; correlating the at least one content characteristic with at least one exercise characteristic, wherein the at least one exercise characteristic is based upon the historic exercise information; obtaining current exercise information indicative of exercise that is currently being performed by the first user; obtaining current television program information indicative of a current television program that is currently being viewed by the first user while the first user performs the current exercise; and executing, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In one example, the historic exercise information is indicative of exercise that had been performed by the first user at a point in time prior to the exercise that is currently being performed by the first user but that is still a part of a current exercise session.

In another example, the historic exercise information is indicative of exercise that had been performed by the first user at a point in time prior to the exercise that is currently being performed by the first user and that is part of a prior exercise session that had been performed before a current exercise session.

In another example, the program of instructions, when executing, further performs storing the correlated content characteristic and exercise characteristic.

In another example, the correlated content characteristic and exercise characteristic upon which the executing is based had previously been stored.

In another example, the exercise characteristic is selected from the group comprising: (a) a speed of an exercise device used by the first user; (b) a resistance of an exercise device used by the first user; (c) a heart rate of the first user; (d) a posture of the first user; (e) a cognitive state of the first user; (f) a shifting of the first user's eyes away from a display upon which the television program had been viewed; and (g) any combination thereof.

In another example, the historic exercise information and the current exercise information are each provided by a device selected from the group comprising: (a) an exercise device; (b) an exercise monitor; and (c) any combination thereof.

In another example, the program of instructions, when executing, further performs: obtaining the stored correlated content characteristic and exercise characteristic associated with the first user; obtaining current exercise information indicative of exercise that is currently being performed by a second user; obtaining current television program information indicative of a current television program that is currently being viewed by the second user while the second user performs the current exercise; and executing, based upon: (a) the obtained stored correlated content characteristic and exercise characteristic associated with the first user; (b) the current exercise information associated with the second user; and (c) the current program information associated with the second user, at least one of: (i) suggesting a change to the second user of at least one attribute of the current television program that is being viewed by the second user while the second user performs the current exercise; (ii) suggesting a change to the second user of at least one attribute of an exercise device that the second user is currently using; (iii) changing at least one attribute of the current television program that is being viewed by the second user while the second user performs the current exercise; and (iv) changing at least one attribute of an exercise device that the second user is currently using.

In another embodiment, a computer-implemented system for television program optimization based upon exercise by a first user is provided, the system comprising: a processor; and a memory storing computer readable instructions that, when executed by the processor, implement: a first obtaining element configured to obtain historic exercise information indicative of exercise that had been performed by the first user; a second obtaining element configured to obtain historic television program information indicative of at least one television program that had been viewed by the first user while the first user had been performing exercise; an analyzing element configured to analyze, based upon the obtained historic television program information, a content of the at least one television program that had been viewed by the first user, wherein the analysis provides at least one content characteristic; a correlating element configured to correlate the at least one content characteristic with at least one exercise characteristic, wherein the at least one exercise characteristic is based upon the historic exercise information; a third obtaining element configured to obtain current exercise information indicative of exercise that is currently being performed by the first user; a fourth obtaining element configured to obtain current television program information indicative of a current television program that is currently being viewed by the first user while the first user performs the current exercise; and a first executing element configured to execute, based upon: (a) the correlated content characteristic and exercise characteristic; (b) the current exercise information; and (c) the current program information, at least one of: (i) suggesting a change to the first user of at least one attribute of the current television program that is being viewed by the first user while the first user performs the current exercise; (ii) suggesting a change to the first user of at least one attribute of an exercise device that the first user is currently using; (iii) changing at least one attribute of the current television program that is being viewed by the first user while the first user performs the current exercise; and (iv) changing at least one attribute of an exercise device that the first user is currently using.

In one example, the computer readable instructions, when executed by the processor, further implement a storing element configured to store the correlated content characteristic and exercise characteristic.

In another example, the computer readable instructions, when executed by the processor, further implement: a fifth obtaining element configured to obtain the stored correlated content characteristic and exercise characteristic associated with the first user; a sixth obtaining element configured to obtain current exercise information indicative of exercise that is currently being performed by a second user; a seventh obtaining element configured to obtain current television program information indicative of a current television program that is currently being viewed by the second user while the second user performs the current exercise; and a second executing element configured to execute, based upon: (a) the obtained stored correlated content characteristic and exercise characteristic associated with the first user; (b) the current exercise information associated with the second user; and (c) the current program information associated with the second user, at least one of: (i) suggesting a change to the second user of at least one attribute of the current television program that is being viewed by the second user while the second user performs the current exercise; (ii) suggesting a change to the second user of at least one attribute of an exercise device that the second user is currently using; (iii) changing at least one attribute of the current television program that is being viewed by the second user while the second user performs the current exercise; and (iv) changing at least one attribute of an exercise device that the second user is currently using.

In another example, the computer readable instructions, when executed by the processor, further implement: a graphical user interface element configured to display to the first user the suggested changes and to receive from the first user approval or disapproval for the suggested changes and configured to display to the second user the suggested changes and to receive from the second user approval or disapproval for the suggested changes.

In other examples, any steps described herein may be carried out in any appropriate desired order.

In another example, implementers may include: TV broadcasters, Cable TV, NETFLIX, makers of exercise devices, fitness centers, and/or rehabilitation centers.

In another example, the invention disclosed may facilitate strength training via the use of TV broadcasts, video games, etc.

In another example, the exercise resistance force may be changed with an exercise device. For example, a device may provide resistance by an electrical motor, and this resistance can be adjusted. Additionally, the resistance can pulsate during an exercise motion, providing a muscle massage. In addition to monitoring speed, heart rate, etc., the user's posture can be tracked to detect the level of user exhaustion. Those and other monitored parameters may be used to adjust the regime for either current or future exercises. The regime may be optimized to increase workout efficiency.

In another example, a special TV program may be unlocked if the exercise performance is on track.

In another example, the following may be provided: continuous monitoring, real-time analysis, and automated and personalized training of exercise. If desired, the system may employ a multi-sensor data acquisition system to measure body sounds, body signs, vital signs, motions, and machine settings continuously and automatically. Using known methods, the signal processing functions can utilize a signal separation and noise removal methodology by which authentic signals can be extracted from interfered signals in noisy environments, even when signals and noises have similar frequency components or are statistically dependent. When performing the monitoring, the system may facilitate monitoring and analysis, and computerized evaluation of level of effort, physical stress, and resulting fatigue during physical activity or exercise. In addition, based on body sound data, or in combination with other monitored physiological signals, and knowledge of the individual and exercise being performed, the system may evaluate the person's physical performance and then act as an automated coach to guide the selection of TV programs, exercise intensity and duration, thereby optimizing and individualizing the training process. The invention can be of use to cardiopulmonary monitoring for athletes for improving the efficiency and safety of exercise, rehabilitation programs for out-of-shape individuals, and routine exercise of the general population.

As described herein, the medium of TV and related broadcasts permits involvement (with respect, for example, to suggestions) in connection with plots, scenery, topics, actors, dialogue, objects on screen, etc.

As described herein, various embodiments may go beyond TV channel selection or show/movie selection. For example, suggestions may be made of shows and/or movies from any of various sources or content providers including, for example, YOUTUBE, NETFLIX and HULU.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for television program optimization based upon exercise by a first user, the method comprising:
   obtaining, by a processor, historic exercise information indicative of exercise that had been performed by the first user;
   obtaining, by the processor, historic television program information indicative of at least one television program that had been viewed by the first user while the first user had been performing exercise;
   analyzing by the processor, based upon the obtained historic television program information, a content of the at least one television program that had been viewed by the first user, wherein the analysis provides at least one content characteristic;
   correlating, by the processor, the at least one content characteristic with at least one exercise characteristic, wherein the at least one exercise characteristic is based upon the historic exercise information;
   storing, by the processor, the correlated content characteristic and exercise characteristic in a memory;
   obtaining, by the processor, current exercise information indicative of exercise that is currently being performed by the first user;
   obtaining, by the processor, current television program information indicative of a current television program that is currently being viewed by the first user while the first user performs the current exercise; and
   executing by the processor, based upon: (a) the stored correlated content characteristic and stored exercise characteristic; (b) the current exercise information; and (c) the current television program information, at least one of:
   (i) suggesting a change to the first user of at least one attribute of the current television program that is being viewed by the first user while the first user performs the current exercise;
   (ii) suggesting a change to the first user of at least one attribute of an exercise device that the first user is currently using;
   (iii) changing at least one attribute of the current television program that is being viewed by the first user while the first user performs the current exercise; and
   (iv) changing at least one attribute of an exercise device that the first user is currently using, and
   obtaining, by the processor, the stored correlated content characteristic and exercise characteristic associated with the first user;
   obtaining, by the processor, current exercise information indicative of exercise that is currently being performed by a second user;
   obtaining, by the processor, current television program information indicative of a current television program that is currently being viewed by the second user while the second user performs the current exercise; and
   executing by the processor, based upon: (a) the obtained stored correlated content characteristic and exercise characteristic associated with the first user; (b) the current exercise information associated with the second user; and (c) the current television program information associated with the second user, at least one of:

(i) suggesting a change to the second user of at least one attribute of the current television program that is being viewed by the second user while the second user performs the current exercise;

(ii) suggesting a change to the second user of at least one attribute of an exercise device that the second user is currently using;

(iii) changing at least one attribute of the current television program that is being viewed by the second user while the second user performs the current exercise; and (iv) changing at least one attribute of an exercise device that the second user is currently using.

2. The method of claim 1, wherein the historic exercise information is indicative of exercise that had been performed by the first user at a point in time prior to the exercise that is currently being performed by the first user but that is still a part of a current exercise session.

3. The method of claim 1, wherein the historic exercise information is indicative of exercise that had been performed by the first user at a point in time prior to the exercise that is currently being performed by the first user and that is part of a prior exercise session that had been performed before a current exercise session.

4. The method of claim 1, wherein the exercise characteristic is selected from the group comprising: (a) a speed of an exercise device used by the first user; (b) a resistance of an exercise device used by the first user; (c) a heart rate of the first user; (d) a posture of the first user; (e) a cognitive state of the first user; (f) a shifting of the first user's eyes away from a display upon which the television program had been viewed; and (g) any combination thereof.

5. The method of claim 1, wherein the historic exercise information and the current exercise information are each provided by a device selected from the group comprising: (a) an exercise device; (b) an exercise monitor; and (c) any combination thereof.

6. A non-transitory computer readable storage medium, tangibly embodying a program of instructions executable by a computer having a processor for television program optimization based upon exercise by a first user, the program of instructions, when executing, cause the processor to perform:

obtaining historic exercise information indicative of exercise that had been performed by the first user;

obtaining historic television program information indicative of at least one television program that had been viewed by the first user while the first user had been performing exercise;

analyzing, based upon the obtained historic television program information, a content of the at least one television program that had been viewed by the first user, wherein the analysis provides at least one content characteristic;

correlating the at least one content characteristic with at least one exercise characteristic, wherein the at least one exercise characteristic is based upon the historic exercise information;

storing the correlated content characteristic and exercise characteristic in a memory;

obtaining current exercise information indicative of exercise that is currently being performed by the first user;

obtaining current television program information indicative of a current television program that is currently being viewed by the first user while the first user performs the current exercise; and executing, based upon: (a) the stored correlated content characteristic and stored exercise characteristic; (b) the current exercise information; and (c) the current television program information, at least one of:

(i) suggesting a change to the first user of at least one attribute of the current television program that is being viewed by the first user while the first user performs the current exercise;

(ii) suggesting a change to the first user of at least one attribute of an exercise device that the first user is currently using;

(iii) changing at least one attribute of the current television program that is being viewed by the first user while the first user performs the current exercise; and (iv) changing at least one attribute of an exercise device that the first user is currently using, and obtaining the stored correlated content characteristic and exercise characteristic associated with the first user;

obtaining current exercise information indicative of exercise that is currently being performed by a second user;

obtaining current television program information indicative of a current television program that is currently being viewed by the second user while the second user performs the current exercise; and executing based upon: (a) the obtained stored correlated content characteristic and exercise characteristic associated with the first user; (b) the current exercise information associated with the second user; and (c) the current television program information associated with the second user, at least one of:

(i) suggesting a change to the second user of at least one attribute of the current television program that is being viewed by the second user while the second user performs the current exercise;

(ii) suggesting a change to the second user of at least one attribute of an exercise device that the second user is currently using;

(iii) changing at least one attribute of the current television program that is being viewed by the second user while the second user performs the current exercise; and (iv) changing at least one attribute of an exercise device that the second user is currently using.

7. The computer readable storage medium of claim 6, wherein the historic exercise information is indicative of exercise that had been performed by the first user at a point in time prior to the exercise that is currently being performed by the first user but that is still a part of a current exercise session.

8. The computer readable storage medium of claim 6, wherein the historic exercise information is indicative of exercise that had been performed by the first user at a point in time prior to the exercise that is currently being performed by the first user and that is part of a prior exercise session that had been performed before a current exercise session.

9. The computer readable storage medium of claim 6, wherein the exercise characteristic is selected from the group comprising: (a) a speed of an exercise device used by the first user; (b) a resistance of an exercise device used by the first user; (c) a heart rate of the first user; (d) a posture of the first user; (e) a cognitive state of the first user; (f) a shifting of the first user's eyes away from a display upon which the television program had been viewed; and (g) any combination thereof.

10. The computer readable storage medium of claim 6, wherein the historic exercise information and the current exercise information are each provided by a device selected from the group comprising: (a) an exercise device; (b) an exercise monitor; and (c) any combination thereof.

11. A computer-implemented system for television program optimization based upon exercise by a first user, the system comprising:

a processor; and a memory storing computer readable instructions that, when executed by the processor configure the processor to:

obtain historic exercise information indicative of exercise that had been performed by the first user;

obtain historic television program information indicative of at least one television program that had been viewed by the first user while the first user had been performing exercise;

analyze, based upon the obtained historic television program information, a content of the at least one television program that had been viewed by the first user, wherein the analysis provides at least one content characteristic;

correlate the at least one content characteristic with at least one exercise characteristic, wherein the at least one exercise characteristic is based upon the historic exercise information;

store the correlated content characteristic and exercise characteristic;

obtain current exercise information indicative of exercise that is currently being performed by the first user;

obtain current television program information indicative of a current television program that is currently being viewed by the first user while the first user performs the current exercise; and execute, based upon: (a) the stored correlated content characteristic and stored exercise characteristic; (b) the current exercise information; and (c) the current television program information, at least one of:

(i) suggesting a change to the first user of at least one attribute of the current television program that is being viewed by the first user while the first user performs the current exercise;

(ii) suggesting a change to the first user of at least one attribute of an exercise device that the first user is currently using;

(iii) changing at least one attribute of the current television program that is being viewed by the first user while the first user performs the current exercise; and (iv) changing at least one attribute of an exercise device that the first user is currently using, and obtain the stored correlated content characteristic and exercise characteristic associated with the first user;

obtain current exercise information indicative of exercise that is currently being performed by a second user;

obtain current television program information indicative of a current television program that is currently being viewed by the second user while the second user performs the current exercise; and execute, based upon: (a) the obtained stored correlated content characteristic and exercise characteristic associated with the first user; (b) the current exercise information associated with the second user; and (c) the current television program information associated with the second user, at least one of:

(i) suggesting a change to the second user of at least one attribute of the current television program that is being viewed by the second user while the second user performs the current exercise;

(ii) suggesting a change to the second user of at least one attribute of an exercise device that the second user is currently using;

(iii) changing at least one attribute of the current television program that is being viewed by the second user while the second user performs the current exercise; and (iv) changing at least one attribute of an exercise device that the second user is currently using.

12. The system of claim 11, wherein the computer readable instructions, when executed by the processor, further configure the processor to:

display to the first user the suggested changes and to receive from the first user approval or disapproval for the suggested changes and configured to display to the second user the suggested changes and to receive from the second user approval or disapproval for the suggested changes.

* * * * *